United States Patent
Ben-Yehuda et al.

(10) Patent No.: US 11,789,632 B1
(45) Date of Patent: Oct. 17, 2023

(54) SYSTEM AND METHOD FOR DATA PLACEMENT IN MULTIPLE TIER STORAGE SYSTEMS

(71) Applicant: Lightbits Labs Ltd., Kfar Saba (IL)

(72) Inventors: Shmuel Ben-Yehuda, Haifa (IL); Ofir Efrati, Even Yehuda (IL); Abel Alkon Gordon, Haifa (IL); Ofer Hayut, Rosh Pina (IL); Eran Kirzner, Moshav Elishama (IL); Alexander Shpiner, Nesher (IL); Roy Shterman, Kfar Saba (IL); Maor Vanmak, Magal (IL)

(73) Assignee: LIGHTBITS LABS LTD., Kfar Saba (IL)

( * ) Notice: Subject to any disclaimer, the term of this patent is extended or adjusted under 35 U.S.C. 154(b) by 0 days.

(21) Appl. No.: 17/372,615

(22) Filed: Jul. 12, 2021

Related U.S. Application Data

(60) Provisional application No. 63/050,814, filed on Jul. 12, 2020.

(51) Int. Cl.
G06F 3/06 (2006.01)
(52) U.S. Cl.
CPC .......... *G06F 3/0647* (2013.01); *G06F 3/0611* (2013.01); *G06F 3/0652* (2013.01); *G06F 3/0659* (2013.01); *G06F 3/0688* (2013.01)
(58) Field of Classification Search
None
See application file for complete search history.

(56) References Cited

U.S. PATENT DOCUMENTS

| | | | |
|---|---|---|---|
| 10,126,981 B1* | 11/2018 | Malina | G06F 3/0647 |
| 2011/0153931 A1* | 6/2011 | Bell, Jr. | G06F 16/122 |
| | | | 711/E12.019 |
| 2014/0208018 A1* | 7/2014 | Benhase | G06F 12/0897 |
| | | | 711/119 |
| 2014/0324920 A1* | 10/2014 | Hamilton | G06F 3/0685 |
| | | | 707/812 |
| 2016/0055171 A1* | 2/2016 | Araki | G06F 3/0604 |
| | | | 707/624 |
| 2018/0365281 A1* | 12/2018 | Patel | G06F 16/13 |
| 2019/0114332 A1* | 4/2019 | Middlecamp | G06F 3/0608 |
| 2020/0097403 A1* | 3/2020 | Saxena | G06F 12/0246 |

* cited by examiner

*Primary Examiner* — Michael Alsip
(74) *Attorney, Agent, or Firm* — PEARL COHEN ZEDEK LATZER BARATZ LLP

(57) ABSTRACT

In a storage system including a first tier and a second tier a method includes: storing access statistics per object; obtaining a request to perform a write operation; calculating a recency factor to the first object based on the access statistics; and writing the first object to one of the first tier and the second tier, depending on the recency factor. Performing garbage collection process on the second tier may include: reading metadata of an object stored in the second tier; determining whether the object is valid based on the metadata; if the object is invalid, discarding the object; and if the second object is valid: calculating a recency factor for the object based on the access statistics of the object; and moving the object to the first tier or leaving the object in the second tier, depending on the recency factor of the second object.

16 Claims, 5 Drawing Sheets

SYSTEM AND METHOD FOR DATA PLACEMENT IN MULTIPLE TIER STORAGE SYSTEMS

CROSS-REFERENCE TO RELATED APPLICATIONS

This application claims the benefit of provisional U.S. Patent Application No. 63/050,814, filed Jul. 12, 2020 and entitled: "SYSTEM AND METHOD FOR DETERMINING AN OPTIMAL SYSTEM AND METHOD OF DATA PLACEMENT IN MULTIPLE TIER STORAGE SYSTEMS", which is hereby incorporated by reference in its entirety.

FIELD OF THE INVENTION

The present invention relates generally to storage devices. More specifically, the present invention relates to data placement in storage systems with multiple tiers.

BACKGROUND

Block storage devices, also referred to herein as block storage media, storage devices, storage media or media, set the base for most current data storage services, such as cloud storage systems. Data is stored in storage devices or systems in blocks, pages or objects e.g., chunks of data, typically of fixed size.

Block storage devices may be implemented using multiple different technologies and have different performance, e.g., different latencies, throughputs, endurances and prices. Typically, the higher performance storage medias are more expensive than lower performance storage medias. In some implementations, a single storage system may include multiple types of storage devices or medias, organized hierarchically in tiers. A tier may include storage media, with given performances and cost. For example, currently available multi-tiered storage systems may include a first tier (e.g., tier 1) including a storage technology that provides high performance, e.g., low latency, high throughput and high endurance, with relatively high cost per storage volume, and a second tier (e.g., tier 2) including a storage technology that provides lower performance, e.g., high latency, low throughput, low endurance with relatively low cost per storage volume. The terms high and low are used herein refer to qualities of a tier of storage media relatively to another tier. Today tiered storage models may include as much five or more tiered storage levels.

Technologies typically used for implementing the higher performing tier of storage may include 3DXpoint storage devices (e.g., Optane®), and technologies typically used for implementing the second or lower performing tier of storage may include NAND flash-based storage. For example, read and write latencies of the first tier may be as low as 5-10 microseconds, while read and write latencies of second tier such as of NAND flash-based storage may be about 100-200 microseconds. Additionally, the endurance of first tier devices may by 10-100 times better than the endurance second tier media such as NAND flash-based storage.

SUMMARY

According to embodiments of the invention, a system and method for data placement in a storage system including a first tier and a second tier may include: storing access statistics per object; obtaining a request to perform a write operation; calculating a recency factor to the first object based on the access statistics; and writing the first object to one of the first tier and the second tier, depending on the recency factor, wherein latency of the first tier is lower compared with latency of the second tier.

According to embodiments of the invention, the access statistics per object may include timing of last N write and read operations to the object, where N is an integer larger than 1.

Embodiments of the invention may include, writing the first object to the first tier if the recency factor of the first object is above a recency threshold and to the second tier otherwise.

Embodiments of the invention may include, increasing the recency threshold if the utilization of the first tier is above a first utilization threshold; and decreasing the recency threshold if the utilization of the first tier is below a second utilization threshold.

Embodiments of the invention may include, performing garbage collection process on the second tier, where performing the garbage collection process may include: reading metadata of objects stored in the second tier; for each of the objects stored in the second tier, determining whether the object stored in the second tier is valid or invalid based on the metadata; discarding invalid objects; and for each valid object: calculating a recency factor for the valid object based on the access statistics of the valid object; and moving the valid object to the first tier or leaving the valid object in the second tier, depending on the recency factor of the valid object.

Embodiments of the invention may include, performing evacuation process on the first tier, where performing the evacuation process may include: calculating a recency factor for a second object stored in the first tier based on the access statistics of the second object; and leaving the second object in the first tier or moving the second object to the second tier, depending on the recency factor of the second object.

According to embodiments of the invention, the recency factor may depend on the timing and number of access operations to the first object.

According to embodiments of the invention, the first tier may include a storage device with access latencies of below 30 microseconds and the second tier may include a NAND storage device.

According to embodiments of the invention, endurance of the first tier may be higher compared with endurance of the second tier.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
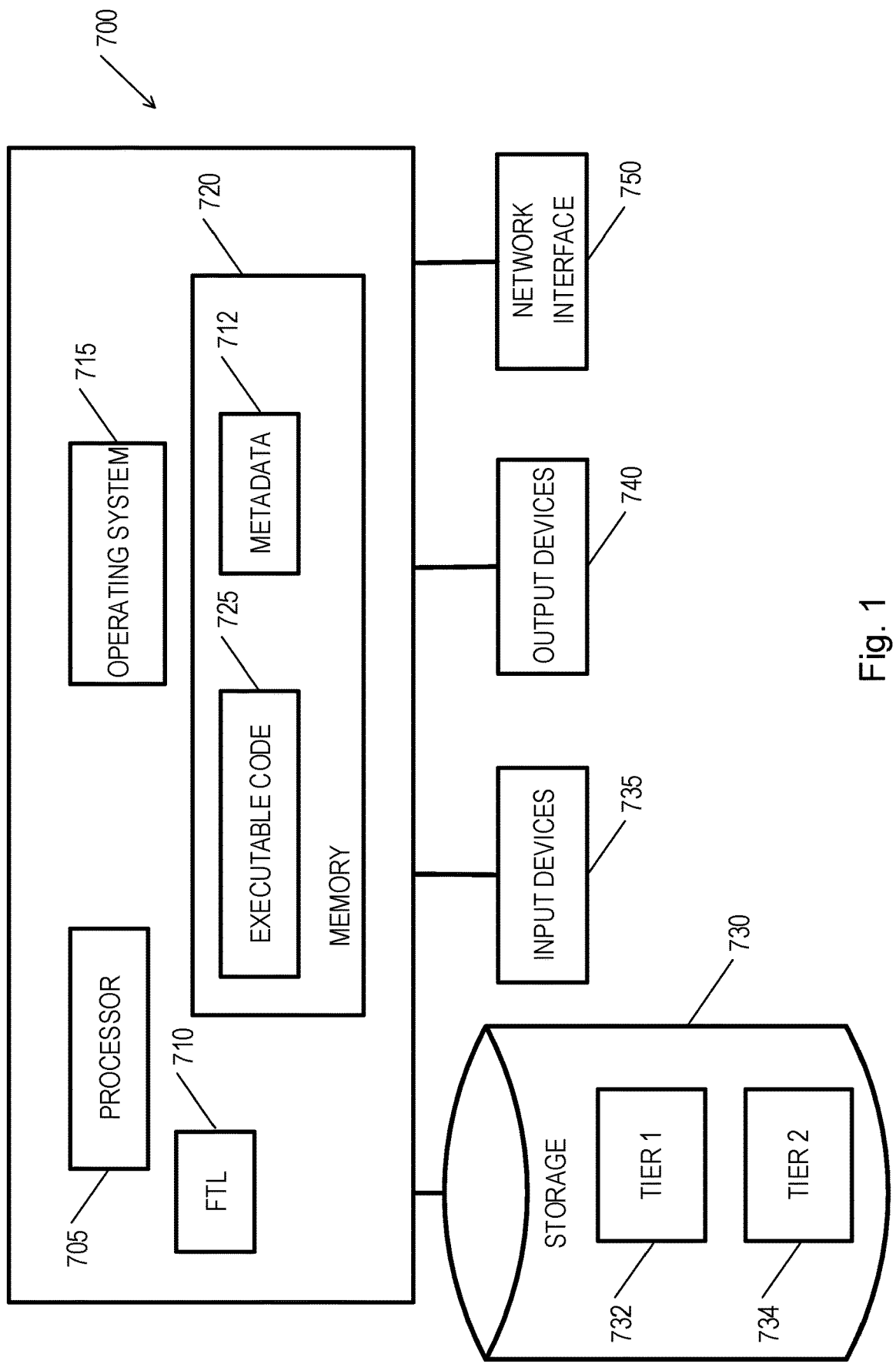
FIG. 1 illustrates an example multi-tiered storage system, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Current multi-tiered storage systems, including multi-tiered cloud storage systems, may include multiple types of storage devices or medias, organized hierarchically in tiers. For example, a first tier (e.g., tier 1) may include a storage technology that provides high performance, e.g., low latency, high throughput and high endurance with relatively high cost per storage volume, and a second tier (e.g., tier 2) may include a storage technology that provides lower performance, e.g., high latency, low throughput and low endurance with relatively low cost per storage volume. Some currently available multi-tiered storage systems may support multi-tier storage media; however, currently available systems do not have an optimal way to decide which data to store on each tier, and when to move data from one tier to another.

According to embodiments of the invention, an object (e.g., a data object) may be placed or stored in one of the available tiers based on frequency of accessing this object. For example, more frequently accessed object may be stored in tier 1, which has relatively high performance, and less frequently accessed object may be stored in tier 2, which has relatively low performances. Thus, more write and read operations may be performed with less latency and higher throughput. This may improve the total system performance in terms of latency and throughput and may extend the endurance of the underlying media.

A typical multi-tiered storage system that includes NAND flash tier may include a flash translation layer (FTL), which may convert between user address space and the local (NAND flash) address space, also called the device physical address space. User writes to the NAND tier may be buffered and written to the NAND tier. A background process, called "garbage collection", may perform an erasure of outdated objects by sequential rewriting of valid objects only in the NAND flash. FTL relies on metadata objects to convert between user address space and local address space. Metadata objects may usually be stored in a fast random-access memory (RAM) structure. In addition to information used for translation between user and local address spaces, metadata entries may contain additional information for every data object.

Typically, the metadata of an object may include information required to locate the object on storage, including, but not limited to, location information of the object, e.g., tier or media type (NAND flash or Optane), location or address within the media or tier and the size of the object. The metadata may include other properties as required by the storage application, e.g., compression, security, snapshot version of object etc.

According to embodiments of the invention, access statistics, e.g., data related to timing and frequency of accessing an object, may be added as metadata entries to the metadata of the object. When writing an object to the multi-tiered storage system, the access statistics may be used to estimate the frequency of accessing that object, and to decide where, e.g., in which tier, to store the object. According to some embodiments, a recency factor, may be calculated for each object upon (e.g., concurrently with, very shortly or immediately after, or triggered by) writing, and a tier may be selected to the object based on the recency factor. For example, objects with high recency factor (e.g., a recency factor above a threshold) may be written to tier 1, and objects with low recency factor (e.g., a recency factor not above the threshold) may be written to tier 2.

Thus, embodiments of the invention may improve the technology of multi-tiered storage system by better allocating objects to tiers, and as a result reducing the average latency and improving the average throughput and endurance of the multi-tiered storage system.

Some embodiments of the invention may be used as block storage devices. Additionally or alternatively, embodiments of the invention, while implemented as block storage device, may be used to emulate objects storage as well.

FIG. 1 illustrates an example multi-tiered storage system, according to an embodiment of the invention. Multi-tiered storage system 700 may include a processor 705 that may be, for example, a central processing unit processor (CPU), a chip or any suitable computing or computational device, an operating system 715, a memory 720, storage 730, input devices 735 and output devices 740. Processor 705 may be or include one or more processors, etc., co-located or distributed. Multi-tiered storage system 700 may be or may include for example a workstation or personal computer, or may be at least partially implemented by one or more remote servers (e.g., in the "cloud").

Operating system 715 may be or may include any code segment designed and/or configured to perform tasks involving coordination, scheduling, arbitration, supervising, controlling or otherwise managing operation of multi-tiered storage system 700, for example. Operating system 715 may be a commercial operating system. Operating system 715 may be or may include any code segment designed and/or configured to provide a virtual machine, e.g., an emulation of a computer system. Memory 720 may be or may include, for example, a random-access memory (RAM), a read only memory (ROM), a dynamic RAM (DRAM), a synchronous DRAM (SD-RAM), a double data rate (DDR) memory chip, a Flash memory, a volatile memory, a non-volatile memory, a cache memory, a buffer, a short-term memory unit, a long term memory unit, or other suitable memory units or storage units. Memory 720 may be or may include a plurality of possibly different memory units.

Executable code 725 may be any executable code, e.g., an application, a program, a process, task or script. Executable code 725 may be executed by processor 705 possibly under control of operating system 715. For example, executable code 725 may be or include software for managing storage 730, according to embodiments of the invention.

Storage 730 may be or may include, for example, a hard disk drive, a non-volatile memory, a flash memory, a floppy disk drive, a Compact Disk (CD) drive, a CD-Recordable (CD-R) drive, a universal serial bus (USB) device or other suitable removable and/or fixed storage unit. Storage 730 may include one or more types of non-volatile block storage devices that may form a first tier 732 and a second tier 734. Although not shown, Storage 730 may include more tires. According to embodiments of the invention, storage 730 may include high performing block storage devices that may form a first tier (tier 1) 732 and low performing block storage devices that may form a second tier (tier 2) 734. For example, the latency of the block storage devices included in first tier 732 may be lower than the latency of the block storage devices included in second tier 734. Similarly, the throughput of the block storage devices included in first tier 732 may be higher than the throughput of the block storage devices included in second tier 734. Typically, the cost of the block storage devices included in first tier 732 may be higher than the cost of the block storage devices included in second tier 734. For example, the read and write latencies of the block storage devices included in first tier 732 may be below 30 microseconds e.g., as low as 5 microseconds, and a write latency of block storage devices included in second tier 734 may be about 100-200 microseconds or even higher. Additionally, the endurance of first tier devices may by 10-100 times better than the endurance second tier media such as NAND flash-based storage. In some implementations, first tier 732 may include 3DXpoint storage devices (e.g., Optane®), and second tier 734 may include NAND flash-based storage. In some embodiments, first tier 732 may include single level cells (SLC) NAND storage devices and second tier 734 may include triple level cells (TLC) or quadruple level cells (QLC) NAND flash-based storage. Other combinations may be used. NAND flash-based storage may include any combination of SLC that allow storage of a single data bit per memory cell, multiple level cells (MLC) that allow storage of two data bits per each memory cell, TLC, QLC and penta-level cells (PLC) that allow storage of three, four and five bits per memory cell respectively, hard disk drive (HDD). Other devices, technologies and latencies may be used.

Figure 2:
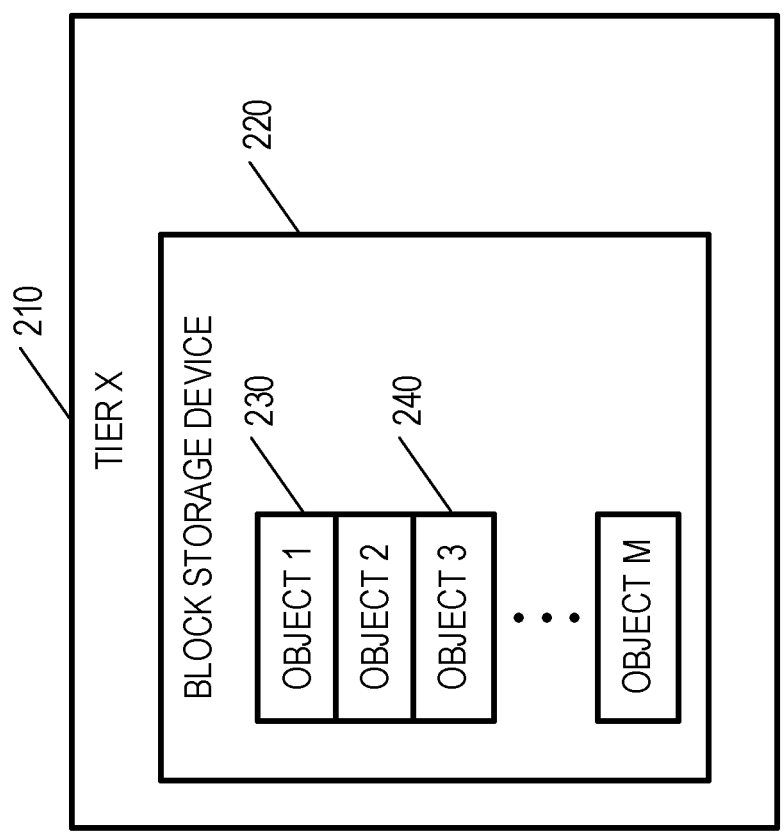
FIG. 2 is a schematic illustration of a tier in a multi-tiered storage system, according to embodiments of the invention.

Reference is now made to FIG. 2, which is a schematic illustration of a tier 210 in multi-tiered storage system 700, according to embodiments of the invention. Tier 210 may represent any tier in storage 730, for example, first tier 732 or second tier 734. Tier 210 may include one or more block storage devices 220, each configured to store data objects 230, also referred to as objects.

Returning to FIG. 1, FTL module 710 may convert or translate addresses between the user address space and the local address space, also called the device physical address space, e.g., the address space of first tier 732 and second tier 734. User writes to the first tier 732 and second tier 734 may be buffered and written sequentially to first tier 732 and second tier 734. A background process, called "garbage collection", may perform an erasure of outdated objects by sequential rewriting of valid objects only in second tier 734, which includes the NAND flash device. FTL module 710 may use metadata objects 712 to convert addresses between the user address space and the local address space. Metadata objects 712 may usually be stored in memory 720. In addition to information used for translation between user and local address spaces, metadata entries may contain other information for every data object, as required by the system. While drawn as a separate module, FTL module 710 may be included in executable code 725 and executed by processor 705, or be embedded in storage 730.

According to embodiments of the invention, FTL module 710, or other components of multi-tiered storage system 700, may decide on data placement in storage 730, e.g., decide or determine whether to write an object 230 to first tier 732 or to second tier 734, and actually write object 734 to the selected tier. FTL module 710 may store access statistics per object 230, for example in memory 720. In some embodiments, the access statistics per object 230 may include timing of last N last or most recent write and read operations to object 230, where N is an integer larger than 1. For example, the access statistics per object 230 may include timing of last 5-20 write and read operations to object 230.

FTL module 710 may decide whether to write object 230 to the first tier 732 or to the second tier 734, based on the access statistics. For example, upon writing an object 230 to storage 730, FTL module 710 may calculate a metric, referred to herein as a recency factor, for the object 230 based on the access statistics, and write the object to one of the first tier 732 and the second tier 734, depending on the recency factor. In some embodiments, the recency factor may increase as the write and/or read operations to the object are more frequent and more recent. Thus, the object may be written to first tier 732 if the recency factor is above a threshold, referred to as a recency threshold, since the object has been accessed recently and frequently. Similarly, the object may be written to the second tier 734 if the recency factor is not above the recency threshold (e.g., equal or below the recency threshold), since the object has not been accessed recently and frequently. Other logic may be used to decide on which tier to write object 230 depending on the access statistics.

According to embodiments of the invention, an object 230 may be written to storage 730, e.g., to first tier 732 or to second tier 734, following a user write operation, as part of the garbage collection process performed on the second tier 734, or as part of an evacuation process performed on first tier 732.

For example, FTL module 710 may perform garbage collection process on second tier 734. NAND flash memory has relatively long erase times. Therefore, in many NAND flash-based storage devices, such as in second tier 734, FTL module 710 may modify a stored object 230 by reading the object 230, modifying the object 230 and writing object 230 to a different location on the NAND flash-based storage. Due to the long erase times of NAND flash-based storage, writing a modified object 230 to another location instead of erasing and rewriting object 230 saves time and improves the performance of the NAND flash-based storage. When writing object 230 to a different location, FTL module 710 may mark former object 230 (that is still stored in the previous physical location) as invalid and new block 230 as valid, e.g., by including a valid/invalid indication in the metadata of the respective object. The garbage collection process may be performed periodically, and/or when second tier 734 is almost full, e.g., when the occupancy of second tier 734 is above a threshold. The garbage collection process is used to free the invalid storage space of invalid objects, e.g., former object 230.

The garbage collection process may include periodically reading metadata 712 of objects 230 and 240, typically from memory 720. For example, metadata 712 of all objects stored in second tier 734 may be read sequentially. After reading metadata 712 of an object 230 or 240, FTL module 710 may determine the validity of objects 230, 240, e.g., determine whether object 230 or 240 is valid or invalid. If the object is invalid, FTL module 710 may discard the invalid object 240, e.g., delete object 240 and/or mark the storage space of the invalid object 240 as empty. According to embodiments of the invention, in case of a valid object 230, FTL module 710 may check the access statistics of the valid object 230, e.g., as stored in the metadata 712, and decide whether to leave object 230 in second tier 734 or move or write valid object 230 to first tier 732, based on the access statistics, similarly to a user initiated write. For example, FTL module 710 may calculate a recency factor for valid object 230 based on the access statistics of object 230, and write object 230 to one of first tier 732 or second tier 734, depending on the recency factor of object 230.

According to embodiments of the invention, FTL module 710 may perform an evacuation process on first tier 734. In some embodiments, FTL module 710 may perform the evacuation process periodically. Additionally or alternatively, FTL module 710 may perform the evacuation process when utilization of first tier 732 is above a threshold, referred to as a utilization threshold. For example, FTL module 710 may perform the evacuation process when utilization of first tier 732 is above 70%, 80%, or another utilization threshold. According to some embodiments, the evacuation process may include obtaining, reading, retrieving or scanning, by FTL module 710 or other component of multi-tiered storage system 700, metadata 712 of objects stored in first tier 732. For example, metadata 712 of some or all objects stored in first tier 732 may be scanned sequentially. FTL module 710 may check the access statistics of the object 230 that is included in the metadata, and decide whether to leave object 230 at the first tier 732 or move object 230 to second tier 734, based on the access statistics, similarly to a user initiated write. For example, FTL module 710 may calculate a recency factor for object 230 based on the access statistics of object 230, and leave object 230 in the first tier 732 or move or write object 230 to second tier 734, depending on the recency factor of object 230.

According to some embodiments, FTL module 710 may change the recency threshold based on utilization of first tier 732, e.g., based on the ratio of occupied storage space of first tier 732 to the total size of first tier 732, or another measure of utilization. For example, FTL module 710 may increase the recency threshold if the utilization of first tier 732 is above a first utilization threshold and decrease the recency threshold if the utilization of first tier 732 is below a second utilization threshold. In some embodiments, the first utilization threshold may equal the second utilization threshold. For example, the first and second utilization thresholds may equal 70%, 80% etc. In some embodiments, the first utilization threshold may be higher than the second utilization threshold. For example, the first utilization threshold may equal 80% and the second utilization threshold may equal 70%. Other utilization thresholds may be used.

In some embodiments, some of the components shown in FIG. 1 may be omitted. For example, memory 720 may be a non-volatile memory having the storage capacity of storage 730. Accordingly, although shown as a separate component, storage 730 may include memory 720.

Input devices 735 may be or may include a mouse, a keyboard, a touch screen or pad or any suitable input device. It will be recognized that any suitable number of input devices may be operatively connected to multi-tiered storage system 700 as shown by block 735. Output devices 740 may include one or more displays, speakers and/or any other suitable output devices. It will be recognized that any suitable number of output devices may be operatively connected to multi-tiered storage system 700 as shown by block 740. Any applicable input/output (I/O) devices may be connected to multi-tiered storage system 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable multi-tiered storage system 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

Figure 3:
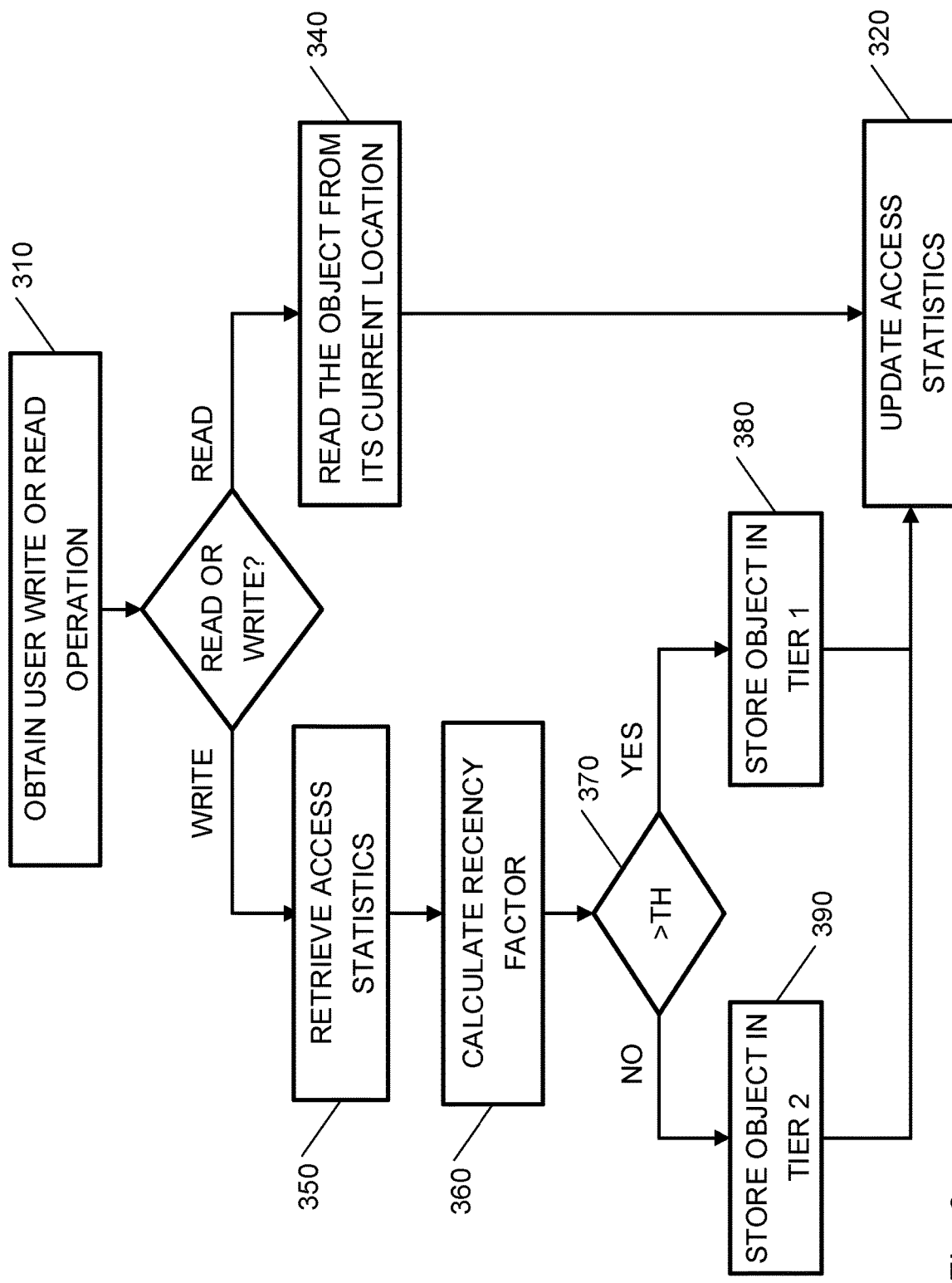
FIG. 3 is a flowchart of a method for performing read and write operations in a multi-tiered storage system, according to embodiments of the invention.

Reference is made to FIG. 3, which is a flowchart of a method for performing read and write operations in a multi-tiered storage system, according to embodiments of the invention. An embodiment of a method for performing read and write operations may be performed, for example, by the system shown in FIGS. 1 and 2, or alternatively by another system.

In operation 310, the processor (e.g., processor 705) may obtain a request or command to perform a read operation or a write operation. For a write operation, the request may include the data that should be written and the addresses to which the data should be written to. For a read operation, the request may include the addresses that the data should be read from. In both the read and write operations, the address may be provided relatively to the user address space. The processor may convert or translate the addresses provided in the read and write operations to the local address space or the device physical address space, e.g., the address space of storage 730. Thus, the processor may identify the object that is accessed by the read or write operation.

If the operation is a read operation, then in operation 340, the processor may retrieve the required data from the specified location, e.g., an object in first tier 732 or second tier 734. If the operation is a write operation, then the processor may have to write the required data to the specified location, e.g., an object in first tier 732 or second tier 734. As known, in many NAND flash-based storage devices, such as second tier 734, modifying a stored object is performed by reading the object, modifying the object and writing the object to a different location on the NAND flash-based storage. Due to the long erase times of NAND flash-based storage, writing a modified object to another location instead of erasing and rewriting the object saves time and improves the performance of the NAND flash-based storage. When writing an object to a different location, the processor may mark the data contained in the previous physical location as invalid.

According to embodiments of the invention, before writing an object to a different location, or before performing the write operation, the processor may, in operation 350, retrieve the access statistics of the accessed object, e.g., metadata 712 stored in memory 720. In operation 360, the processor may calculate a recency factor based on the access statistics. In operation 370, the processor may decide based on the recency factor, e.g., by comparing the recency factor to a recency threshold or using other logic, whether to write the object to the first tier (tier 1), e.g., first tier 732, as indicated in operation 380 or to the second tier (tier 2), e.g., second tier 390. In operation 320, the access statistics of the accessed object may be updated. In some embodiments, the access statistics may be included in the metadata of the object. The access statistics may include, but is not limited to, read and write access counts, access rate, and recent access times. For example, the access statistics of an object may include timing, e.g., timestamps, and other related properties of the object access (e.g., indication of a read or write), of last N write and read operations to the object, where N is an integer larger than 1, organized, for example in a table or a list, e.g., cyclic or linked list. Other access statistics may be used.

Two examples for calculating the recency factor are provided below. The examples are provided in the form of a pseudo code. In the pseudo code, the following parameters are used.

N—the maximal possible number of elements or entries in an access statistics list, where each element may include access parameters such as timestamps and read or write indication;

x—the number actual entries or timestamps in the access statistics list;

t—the timestamp now (t can be for example an unsigned integer counter of system elapsed seconds from a reference point in time from which time is measured, e.g., from EPOCH);

a—the type of current access (e.g., read=0, write=1);

i—an index, i=Last_index+1; if (i>N+1) i=1;

T[i]=(t,a)—the access statistics list;

e—a recency element;

M—a maximum recency value, for example, M=3600*24 (1 day);

AR—recency factor;

RT—recency thresholds; for example, if we set RT=3600*12, if AR>RT, store the object in the first tier, otherwise store the object in the second tier;

The following pseudo-code provides a first example of calculating the recency factor (AR). In this example, the entries in the access statistics list are scanned. If a timestamp of an entry is older than the maximum recency value M than the entry is discarded. Else, a recency element is calculated for the entry, in a way that the recency element is higher as the access is more recent. In this example, the recency element is normalized by the number of actual entries or timestamps in the access statistics list, divided by the maximal possible number of entries in the access statistics list. Thus, an object with a higher number of accesses would get a higher recency factor. The normalized recency elements are summed and divided by N. It is noted that in this example, the AR value is higher as the object is accessed more frequently and more recently.

```
sum = 0
x = 0
i = 0
while (T[x + 1] not-empty and x < N) do { x = x + 1 }        // scan the access
statistics list and get x.
while (i < N) do {
if (t − T[i + 1]) > M do { e = 0 } else { e = (M + T[i + 1]) − t } // compute a
recency element per each timestamp in the access statistics list
sum = sum + e * (x/N)                                        // sum elements, give more weight
to more elements in the access statistics list
i = i + 1
}
AR = sum/N
```

The following provides some numerical examples of using the above pseudo code. In a first numerical example, an object is accessed for the first time. This means x=0, so AR will result in 0. As RT=3600*12, the recency factor is smaller than the recency threshold, AR(0)<RT(3600*12), and the object will be stored in the second tier (the NAND flash storage). In a second numerical example, the maximal possible number of entries in an access statistics list is N=5, and the list is full, e.g., x=5. Therefore: sum=5*(3600*24− 3600*10)*(5/5))=5*3600*14, and AR=sum/5=3600*14.

As RT=3600*12, the recency factor is larger than the recency threshold, AR(1800*14)>RT(3600*12), and the object will be stored in the first tier (e.g., an Optane tier).

In a second pseudo-code example of calculating the recency factor (AR), a different weight is given to read and write operations. For example, a higher weight may be given to write operations comparing to read operations. The second example is similar to the first example, only a weight w is added to the sum calculations, as shown below:

```
                           sum = 0
x = 0
               i = 0
while (T[x + 1] not-empty and x < N) do { x = x + 1 }        // scan the access
statistics list and get x.
               while (i < N) do { if (t − T[i + 1]) > M do { e = 0 } else { e = (M + T[i + 1]) − t } // compute a recency
element per each timestamp in the access statistics list sum = sum + e * w * (x/N)                                    // sum elements, give more
weight to more elements in the access statistics list
   i = i + 1
                   }
AR = sum/N
```

Figure 4:
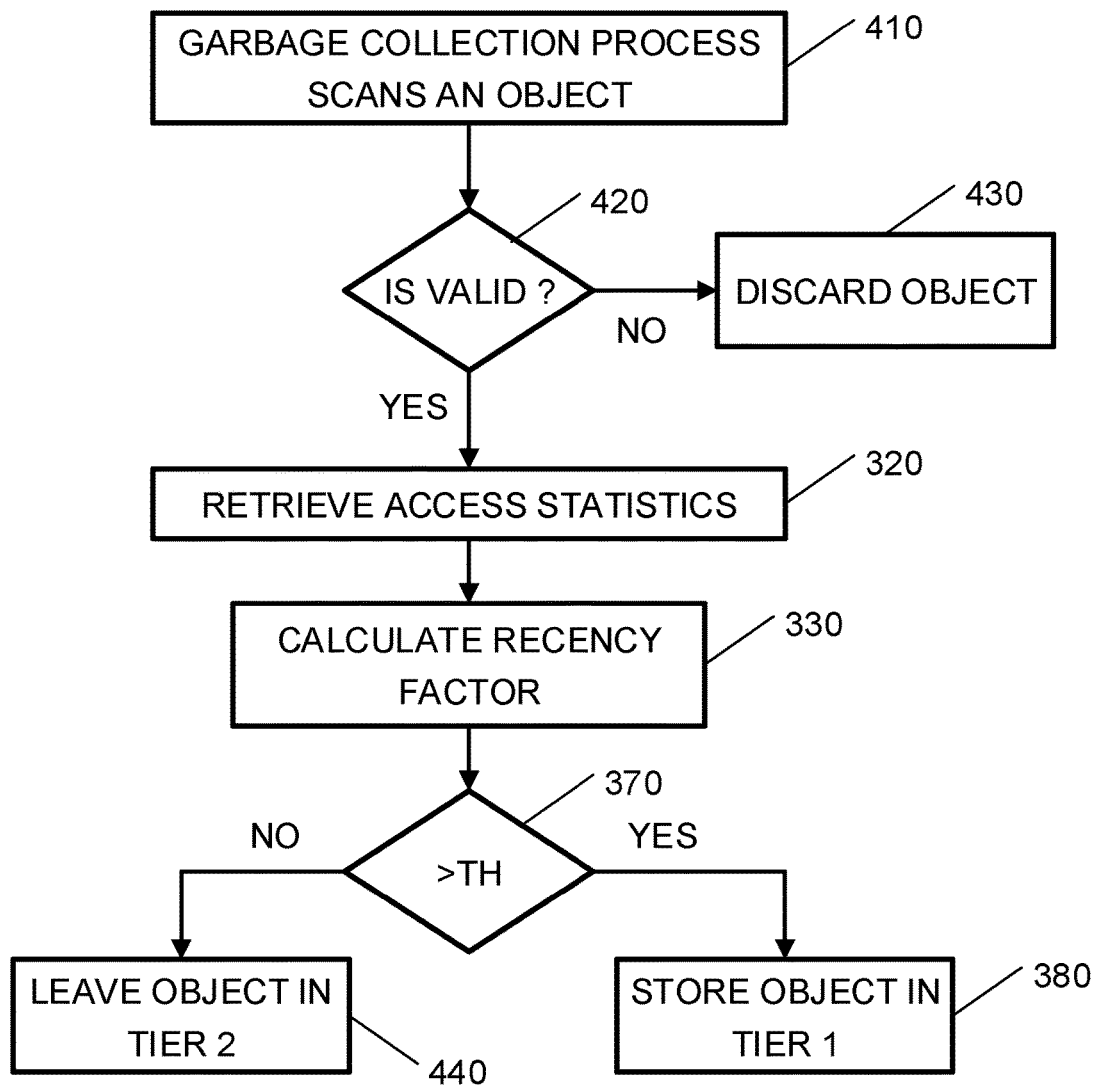
FIG. 4 is a flowchart of a method for determining object location during garbage collection in a multi-tiered storage system, according to embodiments of the invention.

Reference is made to FIG. 4, which is a flowchart of a method for determining object location during garbage collection in a multi-tiered storage system, according to embodiments of the invention. An embodiment of a method for determining object location during garbage collection may be performed, for example, by the system shown in FIGS. 1 and 2, or alternatively by another system. According to embodiments of the method presented in FIG. 4, operations 320, 330, 370, 380 are carried out similarly as described elsewhere herein.

As disclosed, during a garbage collection process, the processor may periodically scan objects from the second tier, e.g., the NAND based storage. According to embodiments of the invention the garbage collection process may be exploited to determine the access frequency and recency of the object, and may be move the object to the first tier. This may be helpful for example in situations where an object that is stored in the second tier has not been written to recently but has been read from very frequently and recently. Thus, the recency factor of such an object may be higher than the recency threshold, but this will not be checked during write operations as disclosed herein, since no write operations are performed to that object.

In operation 410, the processor (e.g., processor 705) may scan an object stored in the second tier, e.g., by retrieving and analyzing metadata of the object, while performing garbage collection. In operation 420, the processor may determine if the scanned object is valid or invalid. If the scanned object is invalid, the processor may discard the object, as indicated in operation 430. If, however, the object is valid, the processor may analyze the access statistics of the object, and may decide, based on the access statistics whether to move or write the object to the first tier, as indicated in operation 380 or leave object in the second tier, as indicated in operation 440.

Figure 5:
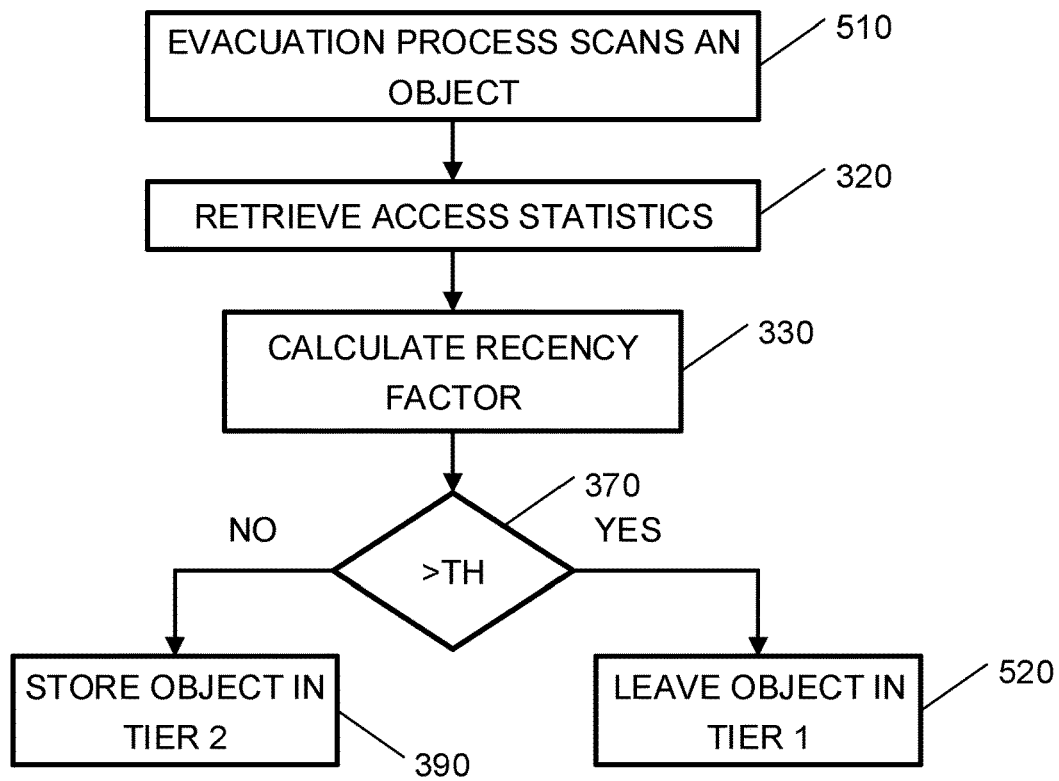
FIG. 5 is a flowchart of a method for determining object location during an evacuation process in a multi-tiered storage system, according to embodiments of the invention.

Reference is made to FIG. 5, which is a flowchart of a method for determining object location during an evacuation process in a multi-tiered storage system, according to embodiments of the invention. An embodiment of a method for determining object location during an evacuation process may be performed, for example, by the system shown in FIGS. 1 and 2, or alternatively by another system. According to embodiments of the method presented in FIG. 5, operations 320, 330, 370, 390 are carried out similarly as described elsewhere herein.

According to embodiments of the invention, the processor may perform an evacuation process on the first tier, to determine if objects that are currently stored in the first tier should be moved to the second tier. An object should be moved from the first tier to the second tier when the object that is currently stored in the first tier is no longer accessed frequently. In this case this object should be moved to the second tier to free space in the first tier for more frequently and recently accessed objects. The processor may perform the evacuation process periodically, to keep the first tier up to date, and/or if the utilization of the first tier is above a utilization threshold.

In operation 510, the processor (e.g., processor 705) may scan or select an object stored in the first tier. The evacuation process may include checking the metadata, and specifically the access statistics of the scanned object, calculating a recency factor, determining whether to leave the scanned object in the first tier, as indicated in operation 520 or to move the scanned object to the second tier, as indicated in operation 390, depending on the recency factor of the scanned object.

Figure 6:
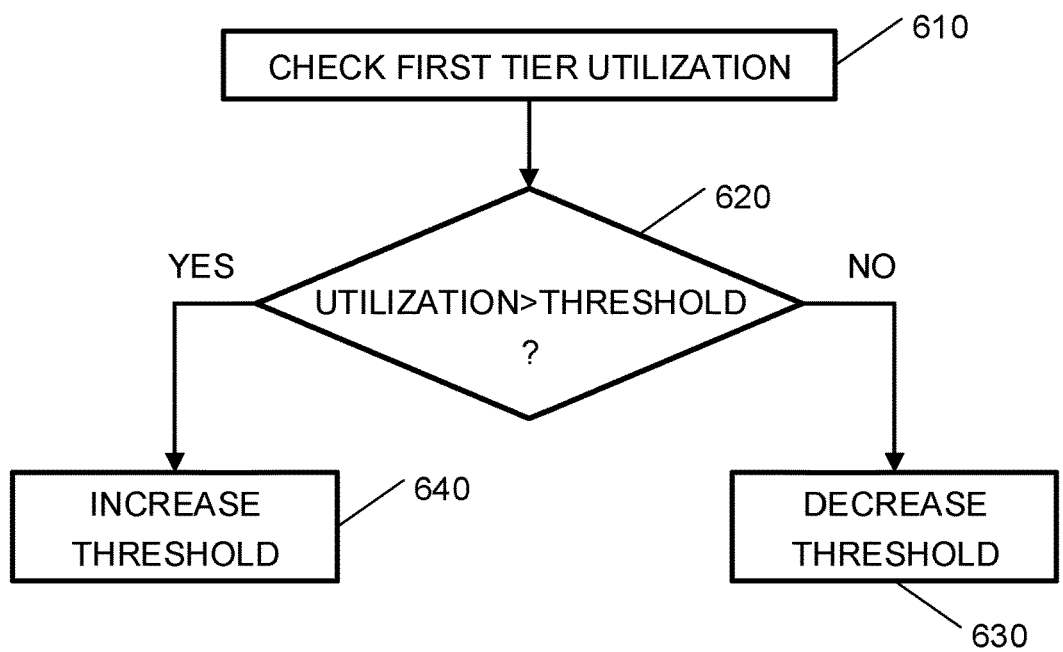
FIG. 6 is a flowchart of a method for updating the recency threshold, according to embodiments of the invention.

Reference is made to FIG. 6, which is a flowchart of a method for updating the recency threshold, according to embodiments of the invention. An embodiment of a method for updating the recency threshold may be performed, for example, by the system shown in FIGS. 1 and 2, or alternatively by another system. According to embodiments of the invention, the recency threshold may be updated to prevent over or under utilization of the first tier. In operation 610, the processor may check, determine or evaluate the utilization of the first tier. For example, the storage system may keep a log or a diary of each write and delete operation to tier the amount of used or occupied storage may updated in accordance. In operation 620, the processor may compare the utilization of the first tier to a utilization threshold. If the utilization of the first tier is higher than the utilization threshold, this may indicate that the first tier is overutilized. Thus, in operation 640, the processor may increase the recency threshold. Increasing the recency threshold may cause more objects to be stored in the second tier, for example following a write operation, garbage collection or evacuation. If the utilization of the first tier is not higher than the utilization threshold, this may indicate that the first tier is underutilized. Thus, in operation 630, the processor may decrease the recency threshold. Decreasing the recency threshold may cause more objects to be stored in the first tier, for example following a write operation, garbage collection or evacuation.

While embodiments of the invention are presented with reference to two-tier storage system, this is not limiting, and embodiments of the invention may be easily augmented to multi-tier storage systems that include three, four or more tires by using more than one recency thresholds. For example, a three-tier storage system may include a first tier including 3dxpoint media, second tier including NAND based SSD, and a third tier including HDD disk. According to embodiments of the invention, a recency threshold may be defined between n each two consecutive tiers. For example, in a three-tier storage system a first recency threshold may be defined between the first tier and the second tier, a second recency threshold may be defined between the second tier and the third tier. The recency thresholds may be updated based on the occupancy to the tiers.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for data placement in a storage system comprising a first tier and a second tier, the method comprising:
    storing access statistics per object;
    obtaining a request to perform a write operation;
    calculating a recency factor related to timing and frequency of accessing an object to a first object based on the access statistics;
    writing the first object to the first tier if the recency factor is above a threshold, and to the second tier otherwise; and
    performing garbage collection process on the second tier by:
        reading metadata of objects stored in the second tier;
        for each of the objects stored in the second tier, determining whether the object stored in the second tier is valid or invalid based on the metadata;
        discarding invalid objects; and
        for each valid object:
            calculating a recency factor related to timing and frequency of accessing an object for the valid object based on the access statistics of the valid object; and
            moving the valid object to the first tier if the recency factor is above a threshold or leaving the valid object in the second tier otherwise,
    wherein latency of the first tier is lower compared with latency of the second tier, and
    wherein the recency factor is calculated by;
        scanning entries in an access statistics list;
        for each entry in the access statistics list
            if a timestamp of the entry is older than a maximum recency value than discarding the entry;
            else, calculating a recency element for the entry such that the recency element is higher as the access is more recent; and
        summing the recency elements of the entries in the access statistics list.

2. The method of claim 1, wherein the access statistics per object comprises timing of last N write and read operations to the object, wherein N is an integer larger than 1.

3. The method of claim 1, comprising writing the first object to the first tier if the recency factor of the first object is above a recency threshold and to the second tier otherwise.

4. The method of claim 3, comprising:
increasing the recency threshold if utilization of the first tier is above a first utilization threshold; and
decreasing the recency threshold if the utilization of the first tier is below a second utilization threshold.

5. The method of claim 1, comprising performing evacuation process on the first tier, wherein performing the evacuation process comprises:
calculating a recency factor for a second object stored in the first tier based on the access statistics of the second object; and
leaving the second object in the first tier or moving the second object to the second tier, depending on the recency factor of the second object.

6. The method of claim 1, wherein the recency factor depends on the timing and number of access operations to the first object.

7. The method of claim 1, wherein the first tier comprises a storage device with access latencies of below 30 microseconds and the second tier comprises a NAND storage device.

8. The method of claim 1, wherein endurance of the first tier is higher compared with endurance of the second tier.

9. A system for monitoring of movement of data in a computer network, the system comprising:
a first tier;
a second tier;
a memory; and
a processor configured to:
store access statistics per object;
obtain a request to perform a write operation:
calculate a recency factor related to timing and frequency of accessing an object to a first object based on the access statistics;
write the first object to the first tier if the recency factor is above a threshold, and the second tier; and
perform garbage collection process on the second tier by:
reading metadata of objects stored in the second tier;
for each of the objects stored in the second tier, determining whether the object stored in the second tier is valid or invalid based on the metadata;
discarding invalid objects; and
for each valid object:
calculating a recency factor related to timing and frequency of accessing an object for the valid object based on the access statistics of the valid object; and
moving the valid object to the first tier if the recency factor is above a threshold or leaving the valid object in the second tier otherwise,
wherein latency of the first tier is lower compared with latency of the second tier, and wherein the recency factor is calculated by;
scanning entries in an access statistics list;
for each entry in the access statistics list
if a timestamp of the entry is older than a maximum recency value than discarding the entry;
else, calculating a recency element for the entry such that the recency element is higher as the access is more recent; and
summing the recency elements of the entries in the access statistics list.

10. The system of claim 9, wherein the access statistics per object comprises timing of last N write and read operations to the object, wherein N is an integer larger than 1.

11. The system of claim 9, wherein the processor is configured to write the first object to the first tier if the recency factor of the first object is above a recency threshold and to the second tier otherwise.

12. The system of claim 11, wherein the processor is configured to:
increase the recency threshold if utilization of the first tier is above a first utilization threshold; and
decrease the recency threshold if the utilization of the first tier is below a second utilization threshold.

13. The system of claim 9, wherein the processor is configured to perform evacuation process on the first tier by:
calculating a recency factor for a second object stored in the first tier based on the access statistics of the second object; and
leaving the second object in the first tier or moving the second object to the second tier, depending on the recency factor of the second object.

14. The system of claim 9, wherein the recency factor depends on the timing and number of access operations to the first object.

15. The system of claim 9, wherein the first tier comprises a storage device with access latencies of below 30 microseconds and the second tier comprises a NAND storage device.

16. The system of claim 9, wherein endurance of the first tier is higher compared with endurance of the second tier.

* * * * *